United States Patent [19]

Ono et al.

[11] 4,415,702
[45] Nov. 15, 1983

[54] RUBBERIZED ASPHALT COMPOSITION AND PROCESS FOR PRODUCING SAME

[75] Inventors: Katsuhiro Ono, Ichikawa; Shigeki Sakimura, Tokyo, both of Japan

[73] Assignee: Idemitsu Kosan Company Limited, Tokyo, Japan

[21] Appl. No.: 347,259

[22] Filed: Feb. 9, 1982

[51] Int. Cl.$^3$ .............................................. C08L 95/00
[52] U.S. Cl. .............................. 524/705; 427/385.5; 524/59; 524/69; 524/71
[58] Field of Search .................. 524/705, 69, 71, 59; 427/385.5

[56] References Cited

U.S. PATENT DOCUMENTS 3,635,864  1/1972  McCarthy et al. ................. 524/705
4,066,599  1/1978  Zimmerman ........................ 524/705

FOREIGN PATENT DOCUMENTS 722924  3/1978  U.S.S.R. .......................... 524/705

Primary Examiner—Melvyn I. Marquis
Attorney, Agent, or Firm—Frishauf, Holtz, Goodman & Woodward

[57] ABSTRACT

A rubberized asphalt composition which comprises a moisture-curing diene series liquid rubber, asphalt and aggregates, and a process for producing same. Liquid rubber having a molecular weight of from 500 to 50,000 and having an isocyanate group or an isocyanate group blocked by phenol or acetoxime as a functional group at the terminals of the molecule is preferably utilized. The liquid rubber comprises from 4 to 10% by weight of the total of liquid rubber and asphalt.

18 Claims, No Drawings

RUBBERIZED ASPHALT COMPOSITION AND PROCESS FOR PRODUCING SAME

BACKGROUND OF THE INVENTION

The present invention relates to a rubberized asphalt composition to be used for the formation of a road pavement, and process for producing same.

Up to now so-called rubberized asphalts or additives for producing various kinds to make so-called rubberized asphalt composition have been developed and put on the market. However, almost all of them are used in a non-vulcanized state, that is, in the state, in which no cross-linking reaction occurs. But, the term "rubber" should originally be understood as a material of elastic properties, which are to be obtained by the cross-linking reaction due to the vulcanization. Therefore, rubberized asphalt composition or rubberized asphalt mixture obtained by mixing the rubberized asphalt compositions with aggregates could not be said to be "rubberized" in the true meaning of the word, since the cross-linking reaction did not occur in them. Heretofore there have been made, of course, many trials for obtaining vulcanizable rubberized asphalt composition, but in vain. The reason was found in that conditions for cross-linking due to the vulcanization, including the selection of curing agents, could not properly be settled for practical operations of the road pavement.

In the recent development in the art of rubberized asphalt compositions for producing rubberized asphalt mixtures to be used for road pavement, Japanese patent publication No. 22319/1968 is noticeable because the idea of producing cross-linking type rubberized asphalt compositions has been disclosed. In this prior art there is proposed a method of producing rubberized asphalt composition, in which asphalt is combined with urethane, which is to be obtained by the reaction of isocyanate with an intermediate diene polymer having allylic hydroxyl groups as functional groups at the terminals of the main chain, and it is characterized in that said urethane is at least partially uncured when combined with the said asphalt. Further, this prior art has advantages that the intermediate polyhydroxy polymer has a viscosity at 30° C. of about 5–20,000 poises, preferably about 15 to 5000 poises and an average molecular weight of 400 to 25,000 and is liquid or semi-solid flowable at ambient temperatures. This prior art could be said to be epoch-making in that the rubber material proposed by this prior art is a liquid rubber of low molecular weight and the cross-linking reaction is effected by the combination of reactive allylic hydroxyl group contained at the terminals of the main chain with isocyanate as a curing agent, whereby paving mixtures having elastic properties should be obtained.

However, there have been not yet known any practical examples, in which cross-linking type rubberized asphalt mixtures have been produced according to the method of the said prior art and applied for practical road pavement operations. This was also due to the fact that the conditions of producing rubberized asphalt composition according to the method of the prior art does not match with the conditions required for practical paving operations.

As already mentioned, the said prior art is characterized in that, when combining asphalt with urethane obtained by the reaction of an intermediate diene polymer having allylic hydroxy groups with isocyanate, said urethane remains in an at least partially uncured state. On the other hand, there is described in the specification of the prior art that the ability of the intermediate diene polymer to react with isocyanate at normal temperature of asphalt pavement, that is, in the range of about 120° F. (about 49° C.)–200° F. (about 94° C.) appears to be largely affected to this more reactive allylic configuration. From the above matters it is easily understandable that the reaction of the intermediate diene polymer with isocyanate is effected by heating, but the reaction should proceed in such way that the urethane to be obtained by the reaction remains in a at least partially uncured state, till said urethane is combined with asphalt. In other words, the at least partially uncured state of the urethane, as is characterized by the prior art, can be maintained by the condition that the reaction is carried out at a low temperature of 120° F. (about 49° C.)–200° F. (about 94° C.).

However, this heating condition does not match with the practical conditions for producing asphalt mixtures to be used for the road pavement. According to the practice of an asphalt mixing plant, it is usual that asphalt is heated to a range of 150° C.–165° C. This temperature range should be regarded as a requisite in consideration of the temperature condition required for the paving operation of the asphalt composition.

According to our experiments it was made clear that the reaction of the intermediate diene polymer with isocyanate was finished at a temperature of 140° C., and the urethane obtained thereby is completely cured. Therefore, the process of Japanese patent publication No. 22319/1968 could not be put on practice.

SUMMARY OF THE INVENTION

In general, in the practical operations of road pavement the most important is a sufficient compression of the asphalt composition by rolling so as to be able to obtain a paving body having a necessary density. This is mainly determined by the temperature and viscosity of the composition to be compressed. The compression of the asphalt composition is usually conducted at a temperature range of from 100° to 140° C. In the case of so-called rubberized asphalt composition a higher temperature range must be taken into consideration for the compression, because the viscosity of the composition is generally higher than in the case of usual asphalt composition on account of the addition of rubber material.

In the case of cross-linking type rubberized asphalt composition a further condition must be added. That is, the cross-linking reaction should not be completed before the compression of the composition would be finished, because otherwise sufficient compression can not be performed. If the reaction is completed too early, the addition of rubber would bring rather an unfavorable result on the formation of a paving body.

On the basis of the above mentioned facts studies have been made by the inventors of the present invention to overcome the disadvantages of the prior art and establish a novel cross-linking type rubberized asphalt composition, which can be practically employed for the formation of paving bodies having sufficient density and excellent elastic properties, and a process for producing same.

An object of the present invention is to provide a novel rubberized asphalt composition to be used for the formation of road pavement, in which the cross-linking reaction of a rubberized asphalt composition is first completed after the compression of the composition is finished.

Another object of the present invention is to provide a process for producing the cross-linking type rubberized asphalt composition.

Still another object of the present invention is to provide rubberized asphalt compositions having elastic properties after compression, and which have an increased resistance against low temperature brittleness when used in cold regions and at the same time an increased resistance against fluid deformation of the paving body when used in warmer regions.

Still other objects of the present invention shall be made clear from the following description.

DETAILED DESCRIPTION OF THE INVENTION

Rubber material used in the present invention is referred to as a moisture-curing diene series liquid rubber. This liquid rubber is characterized by the fact that the curing is performed by the absorption of a small amount of moistures contained in the atmosphere, without using any curing agent.

Further, the rubber material which is utilized in the present invention is distinguished from that of Japanese patent publication No. 22319/1968 in that an isocyanate-terminated diene polymer is used instead of the hydroxy-terminated diene polymer. That is, the rubber material of the present invention contains isocyanate group or isocyanate group blocked by phenol, acetoxime, etc. as a functional group at the terminals of the skeleton chain selected from the group consisting of polybutadiene, styrene butadiene copolymer, polyisoprene, styrene-isoprene copolymer, polypentadiene, acrylonitrile-butadiene copolymer, polychloroprene, isobutylene-isoprene copolymer, copolymer of butadiene and methacrylate of a higher alcohol having 2 to 5 carbon atoms, etc. The rubber material of the present invention is a liquid rubber having low molecular weight of 500–50,000.

As above mentioned, the curing of the liquid rubber of the present invention is effected by the absorption of moisture. For this reason, it is necessary, to protect the same from moisture before it is added to a molten asphalt. As one of means to be taken for this purpose it is recommended to wrap up the same in a film made of moisture-resistant material, for example, synthetic resins. The film must be one that will melt at once at the temperature of the molten asphalt. Asphalt is usually heated at a temperature of from about 150°–165° C. For this purpose, such thermoplastic resins as polyethylene, polypropylene, polyvinylidene chloride, polyvinyl chloride and the like may be employed.

The curing mechanism of the liquid rubber of the present invention is as follows:

As already mentioned, in general the compression of asphalt composition is conducted and finished in a temperature range of from 100° to 140° C., and in the case of the compression of rubberized asphalt composition, said temperature range is a little higher on account of the elevated viscosity of the composition. This temperature condition required for the compression is favorable for the curing of the rubberized asphalt composition of the present invention, because, when the compression temperature is above 100° C., there is no danger of the absorption of the moisture. Consequently, the curing reaction does not occur during the compression and sufficient compression can be performed.

On the other hand, the curing of the composition after the compression must be completed in a short time so far as possible. In the case of the present invention the temperature of the paving body obtained by the compression of the composition decreases rapidly to less than 100° C. Consequently, the absorption of moisture begins and causes the curing of the paving body. According to our experiments the curing reaction has been completed within 24 hours. In this way a paving body having sufficient density and excellent elastic properties could be obtained by the same operations as in the case of usual asphalt compositions.

As regards the technical advantages obtained by the present invention the followings are specially noteworthy. In general there are two problems from the road engineering point of view: one is the problem which occurs in a cold region or snowy region: that is, low temperature brittleness and heavy abrasion of the pavement surface, and the other is that which occurs in warmer region: that is, fluid deformation or so-called "rutting" of the pavement surface. The resistance against low temperature brittleness is expressed by a temperature, at which the brittleness occurs, and the resistance against fluid deformation is expressed by a softening point (temperature) of the asphalt binder. Heretofore it was quite impossible to solve these two problems simultaneously by the same asphalt binder, though various trials have been made. Even when one of these two has been solved, the other could not be fulfilled. The greatest advantage achieved by the present invention resides in that the above mentioned two problems could be solved at the same time by the use of rubberized asphalt compositions. Further, the liquid rubber utilized in the present invention has an advantage in handling since said rubber is of the so-called "one liquid reaction type".

The ratio of adding the liquid rubber of the present invention to a molten asphalt is 4–10 wt. %. This ratio is not against 100 of asphalt, but 100 of the mixture of asphalt and liquid rubber. This means that asphalt of a corresponding amount is replaced by the liquid rubber. If the ratio of the liquid rubber is below 4 wt. %, the effect of the addition is not sufficient, while if the ratio is above 10 wt. % an increase in the effect corresponding to an increase in cost is not obtained. That is, the addition of above 10% is futile.

Asphalt material used in the present invention is not necessary to be specially specified, but may be a usual one having a penetration of from 60 to 100.

Aggregates used in the present invention are also not necessary to be specially specified, and also the particle size and the compositions of aggregates are determined in conformity with regulations specified by governmental organs or communities.

The liquid rubber of the present invention is added to a molten asphalt prepared in any existing asphalt mixing plant, where asphalt compositions are produced. The place of injecting the liquid rubber into the molten asphalt at the mixing plant is not limited, however, the most favorable place is an asphalt weighing box in the mixing plant, where an amount of molten asphalt required for the production of an asphalt composition of one batch is measured. The injection of the liquid rubber into the molten asphalt in the weighing box brings the following advantages: the addition is carried out correctly; the adding operation is easy; the mixing can be carried out perfectly, because the amounts of both asphalt and liquid rubber are relatively small; there is no loss in consuming the liquid rubber, because the addition thereof is carried out only in correspondence with the number of charges and the addition can be automatically controlled in synchronization of the pouring of the molten asphalt into the weighing box.

On the contrary, the addition of the liquid rubber into the kettle, in which a large amount of asphalt is molten, is practically impossible, because the perfect mixing of asphalt and liquid rubber can not be expected. It is also possible to inject the liquid rubber into a mixer placed at the terminal of the mixing plant, where asphalt compositions are produced by mixing the molten asphalt and heated aggregates. However, in this case the injection of the liquid rubber is not for the production of a rubberized asphalt composition, but means the coating of the liquid rubber on the surfaces of asphalt mixtures already prepared in the mixer. This is to be adopted only when the injection of the liquid rubber into the weighing box is not possible.

EXAMPLE

In an asphalt mixing plant having a capacity of producing one ton asphalt composition as one batch, asphalt having a penetration of 80 has been melted and heated up to 150° C. in a kettle. Separately, mineral aggregates having the following composition were heated to 160° C.

| Composition of mineral aggreates | |
|---|---|
| Crushed stones (No. 7) | 40.0% |
| Crushed stones (No. 6) | 17.4% |
| Coarse sands | 14.3% |
| Screenings | 14.3% |
| Fine sands | 10.0% |
| Fillers | 4.0% |
| | 100.0% |

A liquid polybutadiene (4,4'-diphenyl methane diisocyanate; molecular weight 2800) was placed in sacks made of polyethylene film, each of which contain the same in an amount of 500 grams.

Molten asphalt was transferred into an asphalt weighing bucket, in which asphalt is to be weighed in an amount required for producing one charge of an asphalt paving composition, and was weighed and mixed with the liquid polybutadiene put into the same asphalt weighing bucket from another inlet of the weighing bucket according to the following precalculation: as the ratio of the amount of molten asphalt required for producing one ton of the asphalt paving composition being predetermined to be 6.2% (62 kilograms) and the ratio of adding the liquid polybutadiene being 6% of the molten asphalt there was practically weighed 58 kilograms of molten asphalt for one batch (62 kg−62 kg×6%=58.28 kilograms) and 4 kilograms of the liquid rubber in sacks was added thereto.

Rubberized asphalt obtained by the dissolution of the polyethylene sacks was further transferred into a mixer, in which the molten asphalt was mixed with the mineral aggregates heated to 160° C. to produce rubberized asphalt paving mixtures.

The thus obtained rubberized asphalt paving mixtures were immediately transported to a field of work, where the paving mixtures were subjected to compression operations by rolls. The temperature of the paving mixtures at the beginning of the compression operation was 130° C. and that at the termination of the compression operation was about 100° C.

As the temperature of the paving mixtures was thus above 100° C. during the whole process of the compression operations, there occured no absorption of moisture by the paving mixtures, and the curing reaction remained only at an initial stage. Consequently, the compression operations were extremely easy and the satisfactory compression required for obtaining a sufficient density could be achieved. It is to be noted that the compression operations were carried out under the same conditions as in the case of compacting usual straight asphalt paving mixtures.

It was quite striking, contrary to the common sense of those skilled in the art, that the compression operations could be performed rather easier, inspite of the rubber material being added, even as compared with usual asphalt paving mixtures having no addition of rubber materials, because the viscosity of the rubberized asphalt paving mixtures of the present invention was lowered as a result of the addition of the rubber material of the present invention.

After the compression operations have been completed, the hardening reaction proceeded rapidly, as the temperature of the road surface built by the compression of paving mixtures was lowered to below 100° C. The road was at once opened to traffic after the completion of the compression operations.

Meanwhile, laboratory tests such as the Marshall test, the wheel tracking test and the thin film heating test, were carried out. The results of the tests were as follows:

(1) The Marshall test

On the basis of a middle value of amounts of asphalt binder, which may satisfy the norm values obtained from the results of the Marshall test the designated amount of asphalt binder was determined to 6.2%.

Further, the addition of the liquid rubber of the present invention to the asphalt binder was set to 4% or 8% of the latter. The comparative tests made on the rubberized asphalt paving mixtures obtained by the addition of the liquid rubber of the present invention and usual asphalt paving mixtures containing no rubber materials showed the following results.

TABLE 1

| | | Results of the Marshall test in a designated asphalt amount | | | | | | | |
|---|---|---|---|---|---|---|---|---|---|
| | | Item | | | | | | | |
| Binder (%) | Stand-ard | Density (g/cm³) | Theoretical density (g/cm³) | Void (%) 3-6 | Aggregate void (%) | Saturation (%) 70-85 | Stability (kg) >750 | Flow value (1/100 cm) 20-40 | Residual stability (%) >75 |
| | | — | — | | — | | | | |
| Straight Asphalt 60/80 | (6.2) | 2.354 | 2.450 | 3.9 | 18.0 | 78 | 1110 | 29 | — |
| Addition of liquid | (6.2) | 2.339 | 2.449 | 4.6 | 18.7 | 76 | 1120 | 35 | — |

TABLE 1-continued

| | | | Results of the Marshall test in a designated asphalt amount | | | | | |
|---|---|---|---|---|---|---|---|---|
| | | | | Item | | | | |
| Binder (%) | Standard | Density (g/cm³) | Theoretical density (g/cm³) | Void (%) | Aggregate void (%) | Saturation (%) | Stability (kg) | Flow value (1/100 cm) | Residual stability (%) |
| | | — | — | 3-6 | — | 70-85 | >750 | 20-40 | >75 |
| rubber 4% Addition of liquid rubber 8% | (6.2) | 2.335 | 2.448 | 4.8 | 18.9 | 75 | 1100 | 36 | — |

(2) The wheel tracking test

In general, for the purpose of rating the resistance to fluid deformation of asphalt paving mixtures at a time of high temperature a test method developed by Traffic Road Research Laboratory (TRRL) in England, that is, so-called "wheel tracking test" is usually applied. For rating the resistance to fluid deformation of the rubberized asphalt paving mixtures of the present invention, this test was also adopted.

This test is to evaluate the resistance to fluid deformation of asphalt paving mixtures at a time of high temperature (60° C.) by simulating "corrugation by rutting" to be caused by rolling of heavy vehicles and "kneading effect" to be caused by repeated rolling of vehicles on actual roads.

The results of the tests comparatively made on usual asphalt paving mixtures containing no rubber materials and the rubberized asphalt paving mixtures containing the cross linking type liquid polybutadiene prepolymer of the present invention in various ratios were as follows.

These facts show the remarkable effect of the addition of the cross-linking type liquid rubber of the present invention to the prevention of the fluid deformation which is easily produced at a relatively high temperature on the surface of a paved body of road.

(3) The experiments made on the softening point and the Frass breaking point

As the resistance to the fluid deformation at high temperature is simply indicated by the softening point of an asphalt binder and the resistance to rupture at a low temperature is also indicated by the Frass breaking point, experiments were carried out to show differences in behavior at high temperature and at low temperature between the rection type asphalt binder of the present invention and a usual straight asphalt binder. The results of the experiments were as follows.

In the experiments the rolling thin film heating method, which simulates practical use, was adopted.

TABLE 11

| | | Results of the Wheel tracking test | | | |
|---|---|---|---|---|---|
| | | | Item | | |
| Binder | Days of curing (day) | Density (g/cm³) | Standard density (g/cm³) | Rate of compression (%) | Rate of deformation (RD) ($\times 10^{-2}$ mm/mm) | Dynamic stability (DS) ($\times 10^2$ times/mm) |
| Straight asphalt 60/80 | 2 | 2.358 | 2.354 | 100.2 | 8.6 | 4.9 |
| | 5 | 2.367 | " | 100.6 | 5.4 | 7.8 |
| | 7 | 2.350 | " | 99.8 | 6.9 | 6.1 |
| | 14 | 2.356 | " | 100.1 | 8.5 | 4.9 |
| | 35 | 2.344 | " | 99.6 | 5.7 | 7.4 |
| Addition of liquid polybutadiene 4% | 2 | 2.355 | 2.339 | 100.7 | 2.2 | 19.1 |
| | 5 | 2.358 | " | 100.8 | 2.3 | 18.3 |
| | 7 | 2.359 | " | 100.9 | 3.0 | 14.0 |
| | 14 | 2.350 | " | 100.5 | 2.0 | 21.0 |
| | 35 | 2.327 | " | 99.5 | 1.4 | 30.0 |
| Addition of liquid polybutadiene 8% | 2 | 2.358 | 2.334 | 101.0 | 0.7 | 60.0 |
| | 5 | 2.361 | " | 101.2 | 0.6 | 70.0 |
| | 7 | 2.346 | " | 100.5 | 0.5 | 84.0 |
| | 14 | 2.342 | " | 100.3 | 0.4 | 105.0 |
| | 35 | 2.330 | " | 99.8 | 0.4 | 105.0 |

As is evidently seen from Table 11, in the case of the usual straight asphalt paving mixtures containing no rubber materials the rate of deformation (R.D.) was 5.7 ($\times 10^{-2}$ mm/mm) on the 35th curing day, whereas in the case of the paving mixtures of the present invention on the same curing day the rate of deformation showed 2.0, when the addition of the liquid rubber was 4%, and further showed 0.4, when the addition of the liquid rubber was 8%, demonstrating that the rate of deformation is lowered, as the addition of the liquid rubber increases. Particularly, it is to note that the rate of deformation in the case of the higher addition of the liquid rubber as of 8% was less than 1/10 of that in the case of no rubber addition.

TABLE 111

The softening point and the breaking point of the cross-linking reaction type diene series rubberized asphalt binder of the present invention (average value)

| Addition of liquid asphalt (%) | 0 | 2 | 4 | 6 | 8 | 10 |
|---|---|---|---|---|---|---|
| Softening point (°C.) | 50° C. | 54° C. | 61° C. | 82° C. | 135° C. | 150° C. |
| Frass breaking point (°C.) | −12 | −13 | −15 | −17 | −18 | −19 |

As is evident from the above Table 111, the softening point as well as the Frass breaking point showed large improvement, as the addition of the liquid rubber of the present invention increases. Particularly, the improvement in the softening point at high temperature exceeds the known levels which prevailed in the art.

An increase in the softening point up to 60° C. had been regarded as the maximum effect to be expected by the addition of known additives designated for improving properties of ashalt binders. High softening points such as of 82° C. and even 135° C. attained by the addition of the liquid rubber of the present invention in ratios of 6 and 8%, respectively, must be said to be values on different levels far beyond all that would have been effected in the art.

At last, the following is to be further added. When using known additives designated for improving properties of asphalt binders, it was usual that an improvement of the resistance to the fluid deformation at a high temperature on the one side was accompanied by deterioration of properties of the asphalt binders on the other side, when used in cold regions, as compared with usual straight asphalt binders containing no rubber materials. In view of this fact, it must be said to be unexpected effect achieved by the present invention that both requirements, that is, an improvement of the resistance to fluid deformation and an increase in the resistance to cold rupture, could be fulfilled at the same time, which was evidently attributed to the effect of the rubber-elastic paving body formed by the cross-linking reaction of the liquid rubber of the present invention.

We claim:

1. A rubberized asphalt composition which comprises moisture-curing diene polymer liquid rubber, asphalt and aggregates, said liquid rubber being in an amount of from 4 to 10 percent based on the total weight of said liquid rubber and said asphalt; and said liquid rubber having a molecular weight of from 500 to 50,000 and having an isocyanate group as a functional group at the terminals of the molecule for cross-linking when contacted with water.

2. The composition of claim 1, wherein said asphalt has a penetration of from 60 to 100.

3. The composition of claim 1, wherein said isocyanate functional group at the terminals of the molecule is a blocked isocyanate.

4. The composition of claim 2, wherein said isocyanate group at the terminals of the molecule is an isocyanate group blocked by phenol or acetoxime.

5. The composition of claim 1, wherein said diene polymer of said liquid rubber having an isocyanate group as a functional group at the terminals of the molecule is a polymer selected from the group consisting of polybutadiene, styrene-butadiene copolymer, polyisoprene, styrene-isoprene copolymer, polypentadiene, acrylonitrile-butadiene copolymer, polychloroprene, isobutylene-isoprene copolymer, and a copolymer of butadiene and a methacrylate of a higher alcohol containing 2 to 15 carbon atoms.

6. The composition of claim 4, wherein said diene polymer of said liquid rubber having an isocyanate group as a functional group at the terminals of the molecule is a polymer selected from the group consisting of polybutadiene, styrene-butadiene copolymer, polyisoprene, styrene-isoprene copolymer, polypentadiene, acrylonitrile-butadiene copolymer, polychloroprene, isobutylene-isoprene copolymer, and a copolymer of butadiene and a methacrylate of a higher alcohol containing 2 to 15 carbon atoms.

7. The composition of claim 2, wherein said diene polymer liquid rubber is a polybutadiene.

8. The composition of claim 4, wherein said isocyanate is blocked with phenol.

9. A process for producing a rubberized asphalt composition which comprises adding a moisture-curing diene polymer liquid rubber to a molten asphalt at a temperature above 100° C., mixing them to form a rubberized asphalt mixture and blending said rubberized asphalt mixture with aggregates said liquid rubber being in an amount of from 4 to 10 percent based on the total weight of said liquid rubber and said asphalt; and said liquid rubber having a molecular weight of from 500 to 50,000 and having an isocyanate group as a functional group at the terminals of the molecule for cross-linking when contacted with water.

10. The process of claim 9, wherein said liquid rubber which is added to said asphalt is encased in a film made of a moisture-resistant material.

11. The process of claim 9, wherein said moisture-resistant material is thermoplastic resin which melts or deforms at the temperature of said mixture.

12. The process of claim 9, wherein said asphalt has a penetration of from 60 to 100.

13. The process of claim 9, wherein said isocyanate functional group at the terminals of the molecule is a blocked isocyanate.

14. The process of claim 12, wherein said isocyanate group at the terminals of the molecule is an isocyanate group blocked by phenol or acetoxime.

15. The composition of claim 9, wherein said diene polymer of said liquid rubber having an isocyanate group as a functional group at the terminals of the molecule is a polymer selected from the group consisting of polybutadiene, styrene-butadiene copolymer, polyisoprene, styrene-isoprene copolymer, polypentadiene, acrylonitrile-butadiene copolymer, polychloroprene, isobutylene-isoprene copolymer, and a copolymer of butadiene and a methacrylate of a higher alcohol containing 2 to 15 carbon atoms.

16. The composition of claim 14, wherein said diene polymer of said liquid rubber having an isocyanate group as a functional group at the terminals of the molecule is a polymer selected from the group consisting of polybutadiene, styrene-butadiene copolymer, polyisoprene, styrene-isoprene copolymer, polypentadiene, acrylonitrile-butadiene copolymer, polychloroprene, isobutylene-isoprene copolymer, and a copolymer of butadiene and a methacrylate of a higher alcohol containing 2 to 15 carbon atoms.

17. The process of claim 12, wherein said diene polymer is a polybutadiene.

18. The process of claim 14, wherein said isocyanate is blocked with phenol.

* * * * *